May 3, 1949.  E. E. SUITER  2,468,790
AIRCRAFT LANDING GEAR
Filed Sept. 24, 1945  2 Sheets-Sheet 1
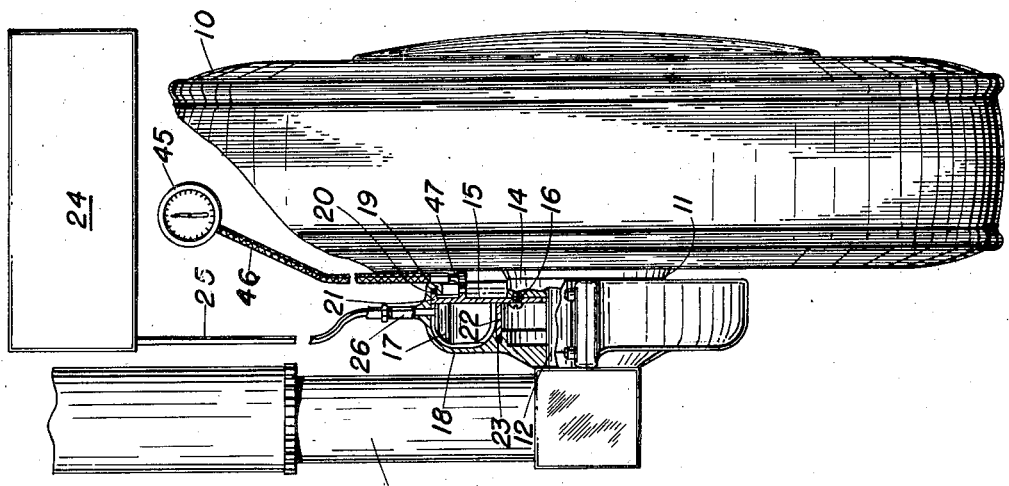
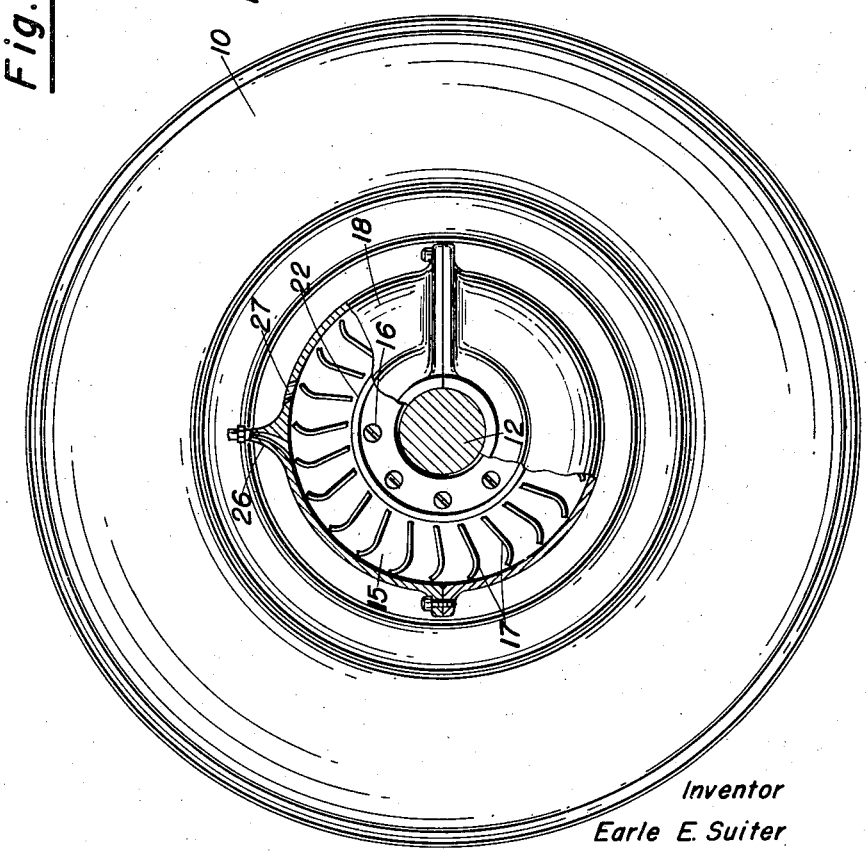
Inventor
Earle E. Suiter
By Ralph L. Chappell
Attorney May 3, 1949.  E. E. SUITER  2,468,790
AIRCRAFT LANDING GEAR
Filed Sept. 24, 1945  2 Sheets-Sheet 2
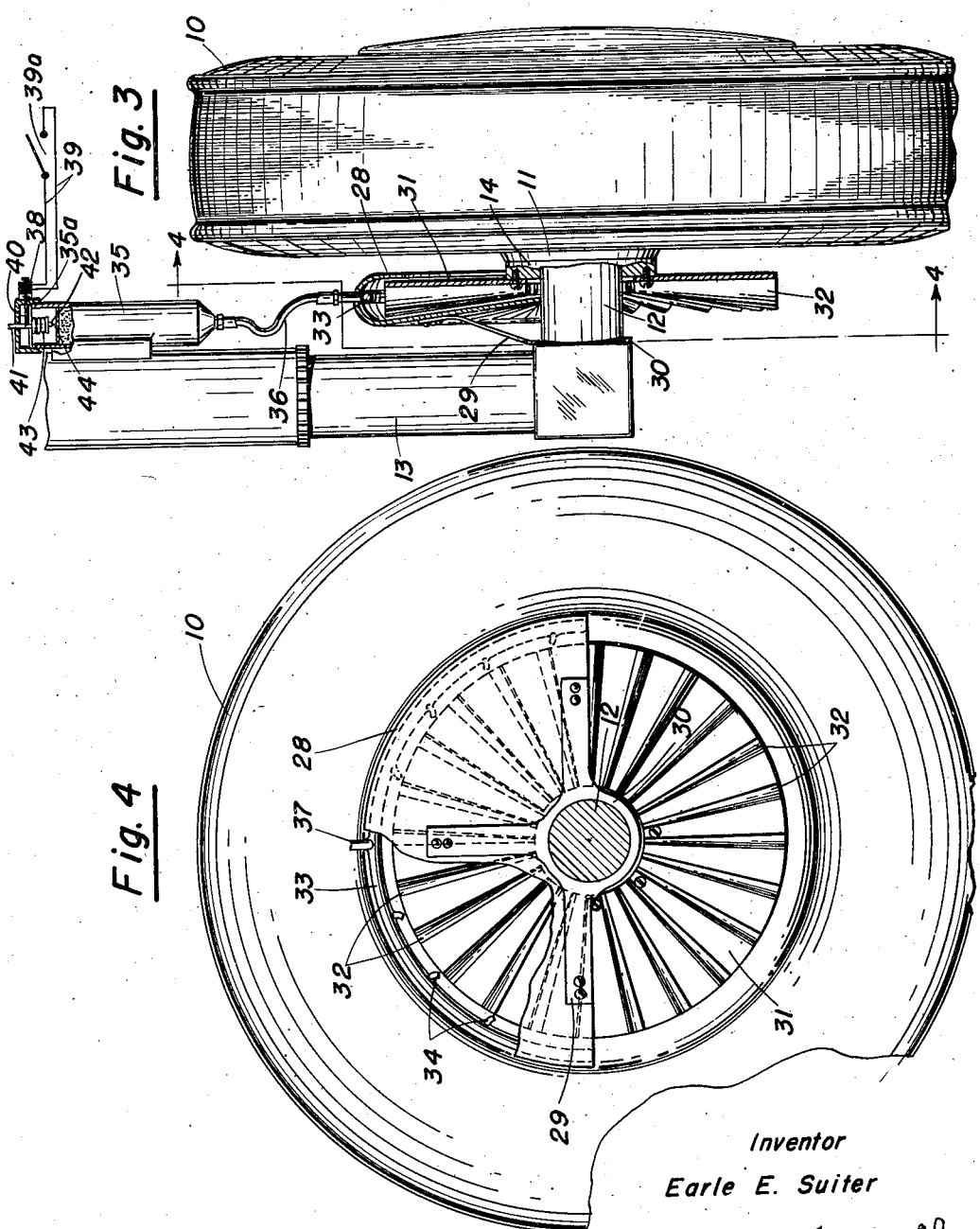
Inventor
Earle E. Suiter
By Ralph L Chappell
Attorney Patented May 3, 1949

2,468,790

UNITED STATES PATENT OFFICE 2,468,790

AIRCRAFT LANDING GEAR

Earle E. Suiter, United States Navy

Application September 24, 1945, Serial No. 618,379

4 Claims. (Cl. 244—103)

(Granted under the act of March 3, 1883, as amended April 30, 1928; 370 O. G. 757)

The present invention relates to new and useful improvements in aircraft, and more particularly to such improvements in landing gear for airplanes and the like.

In aircraft equipped with landing wheels, the length of useful and safe service of the pneumatic tires is extremely short. This is primarily occasioned by the tremendous friction to which the tires are subjected during landing as the result of the tires contacting the ground while stationary, but with the airplane traveling at the required landing speed which, in larger airplanes, is substantial. To counteract this condition, various efforts have been made to impart rotation to the wheels prior to actual contact with the ground, as for instance, by providing the tires with air scoops which operate when the wheels are lowered to impart rotation thereto. However, such arrangements have been proven objectionable because sufficient prerotational speed is not obtained and because the air scoops are liable to damage as the tires flatten during the initial landing operation.

One of the principal objects of the present invention is to provide fluid pressure reaction means operable at the will of the pilot for effecting rotation of the landing wheels prior to contact with the ground.

Another object of the invention is to provide fluid operated impeller means associated with the wheels and suitably connected thereto for rotating the same.

By providing a controlled mechanism for rotating the landing wheels at a speed corresponding to the landing speed of the airplane, friction is substantially reduced and drag on the landing gear is also reduced. It also operates to reduce or eliminate oscillation of the landing gear and aids in the control of the aircraft during landing operations by eliminating or reducing harmonic vibration between the landing gear and the tail boom. In high altitude flight, the wheels often become "frozen" and the positive fluid pressure rotating means will serve to release the wheels from any such "frozen" condition.

The invention still further aims to provide a mechanism of the above type which is relatively light in weight, simple in construction, easily maintained, and effective in operation.

The above and other objects of the invention will in part be obvious and will be hereinafter more fully pointed out.

In the accompanying drawings:

Fig. 1 is a fragmentary end view of one of the landing wheels with a part of one form of impeller shown in section.

Fig. 2 is a side view of Fig. 1 showing a part of the impeller casing removed and in section.

Fig. 3 is an end view, similar to Fig. 1, but showing a modified form of impeller mechanism in section.

Fig. 4 is a view taken substantially along the line 4—4 of Fig. 3.

Referring more in detail to the accompanying drawings, and particularly to Figs. 1 and 2 thereof, one wheel of a conventional type of retractible landing gear is shown. Thus, the pneumatic tire 10 is illustrated as being mounted on a hub 11 which, in turn, is mounted for rotation on a stub shaft 12. The stub shaft 12 is suitably secured to the depending end of a conventional shock strut 13.

The hub portion 11 carries an annular plate 14 to which is secured a rotor plate 15 by bolts 16 or the like. The rotor plate 15 carries at the outer edge thereof a plurality of spaced impeller blades 17 which are inclosed within a casing 18 thus forming a turbine mechanism. The casing 18 is fixed to the stub shaft 12 and is provided with a downwardly and inwardly bent outer edge portion 19 which carries a packing 20. The rotor plate 15 has the outer edge thereof directed outwardly, as at 21, to extend toward the packing 20 in order to effect a fluid tight seal. At the inner edges of the blades 17, the rotor plate 15 is provided with a laterally extended cylindrical portion 22 which extends into a recess in the casing 18, this recess being also provided with a packing 23 for sealing the annular chamber of the casing within which the blades rotate.

In this form of the invention, the impelling fluid may be compressed air or the like contained in a pressure tank 24 suitably mounted on the airplane; or the impelling fluid may be provided by a compressor, or still further, the impelling fluid may be provided by the form shown in Figs. 3 and 4. As shown in Figs. 1 and 2, a conduit 25 leads from the tank 24, or compressor, to the inlet 26 of the casing 18. The inlet is suitably curved to accurately direct the fluid under pressure against the blades 17 and an exhaust 27 in the casing 18 is provided immediately in rear of the inlet 26.

A slightly modified form of impeller means is shown in Figs. 3 and 4. In this form of invention, an arcuate apron 28, substantially U-shaped in cross section, is fixedly secured to the stub shaft 12 by means of bracing arms 29 carried by an annular plate 30 secured to the shaft 12 or to the end of the shock strut 13. The rotor or impeller in this form of the invention is in the form of an annular plate 31 secured to the plate 14 on the hub 11 of the wheel. The plate 31 is provided with outwardly extending blades 32 which run within the apron 28 during the top hemispherical part of its path of travel. Thus, the apron covers the rotor only across the upper semicircular part thereof. At the lower semicircular part of the path of travel of the rotor, the blades are shaped so that the air stream striking the same as the result of forward movement of the airplane will tend to rotate the wheel in a counter-clockwise direction, as viewed in Fig. 4. The apron covering the upper semicircular path of travel of the rotor is for the purpose of preventing pressure of the air stream from effecting the blades in this area. Within the outer edge of the apron is mounted an arcuate conduit 33 disposed around the outer periphery of the rotor and within the adjacent wall portion of the apron. The conduit 33 is provided with a plurality of jets 34 arranged so as to direct fluid under pressure against the blades 32 in order to also drive the wheel in a counter-clockwise position.

The source of supply of fluid under pressure may be of any convenient type, such as that illustrated and suggested in connection with Figs. 1 and 2, but in the instant form of the invention, reference being had to Fig. 3, there is shown a still further modified source of supply for the impelling fluid. A cartridge casing 35 may be mounted on the strut 13 and connected by tubing 36 to the inlet end 37 of the conduit 33. The cartridge contains a chemical, powder or the like, which, when ignited, will generate gas under pressure to be released through the jets 34 against the rotor blades 32. The setting-off or ignition of the contents of the cartridge case 35 may be controlled directly by the pilot through any form of mechanism, one type of which is shown in Fig. 3. The cap 35a of the cartridge case 35 carries a solenoid, the actuation of which may be controlled by a switch 39a immediately available to the pilot and operating through the circuit connectors 39. The core of the solenoid carries a latching pin 40 which normally engages a notch in a plunger 41 to maintain the firing pin 42 elevated against the action of a coil spring 43 and out of contact with a detonating cap 44. When the solenoid circuit is energized, the latch 40 is withdrawn from engagement with the plunger 41 so that the spring 43 will force the firing pin 42 into engagement with the detonating cap 44 and the explosion of this cap will ignite the contents of the cartridge case 35.

From the foregoing description it will be seen that in both forms of the invention, fluid under pressure is utilized for impelling a bladed rotor which is suitably connected to the wheel in order to rotate the same. Conceivably, the rotor could be connected to the wheel by reduction gearing so as to increase the speed of rotation thereof. Then too, a tachometer 45 may be mounted in the cockpit and driven by a flexible cable (not shown) in a conduit 46. The cable may be geared or otherwise connected to the wheel or rotor, as at 47, for visually indicating to the pilot when the speed of rotation of the wheels has reached the speed corresponding to the landing speed of the airplane so as to reduce to a minimum frictional wear on the tire as it comes in contact with the ground. In the form of invention shown in Figs. 1 and 2, the wheel is driven by a turbine mechanism and the impelling fluid thereof may be supplied from any suitable source. In the form of the invention shown in Figs. 3 and 4, impelling fluid is directed against the rotor blades only during the upper hemispherical portion of its travel and movement of the rotor is augmented in the lower portion of its travel by the impact of the airstream striking the rotor blades outside of the protective apron.

While certain forms of the invention have been shown and described for purpose of illustration, it is to be clearly understood that various changes in the details of the construction, arrangement of parts and mode of operation may be accomplished without departing from the scope of the invention as set forth in the appended claims.

The invention described herein may be manufactured and used by or for the Government of the United States of America for governmental purposes without the payment of any royalties thereon or therefor.

What I claim is:

1. In an aircraft having a landing wheel, means for prerotating the wheel comprising: fluid reaction means associated with said wheel; means containing an explosive charge connected to said fluid reaction means; and means for exploding said explosive charge including a firing pin adjacent said explosive charge, a resilient member urging said firing pin towards said explosive charge, a releasable latch preventing movement of said firing pin and an energizable solenoid for actuating the latch thereby permitting said firing pin to move under the influence of said resilient member for exploding the explosive charge whereby the gases resulting from the explosion will actuate said fluid reaction means to cause prerotation of the landing wheel.

2. In an aircraft having a landing wheel, means for prerotating the wheel comprising: rotary impeller means connected to said wheel and having a casing overlying a portion of said impeller means, the remaining portion of said impeller means being exposed to the airstream whereby to rotate the same; means containing an explosive charge connected to said casing; and means for exploding said explosive charge including a firing pin adjacent said explosive charge, a resilient member urging said firing pin towards said explosive charge, a releasable latch preventing movement of said firing pin and an energizable solenoid for actuating the latch thereby permitting said firing pin to move under the influence of said resilient member for exploding the explosive charge whereby the gases resulting from the explosion will actuate said fluid reaction means to cause prerotation of the landing wheel.

3. In an aircraft having a landing wheel, means for prerotating the wheel comprising: a rotary bladed impeller connected to said wheel; a casing completely enclosing said impeller, said casing having an exhaust port opening to the atmosphere and an inlet port; means containing an explosive charge connected to the inlet port of said casing; and means for exploding said explosive charge including a firing pin adjacent said explosive charge, a resilient member urging said firing pin towards said explosive charge, a releasable latch preventing movement of said firing pin and an energizable solenoid for actuating the latch thereby permitting said firing pin to move under the influence of said resilient member for exploding the explosive charge whereby the gases resulting from the explosion will actuate said fluid reaction means to cause prerotation of the landing wheel.

4. In an aircraft having a landing wheel, means for prerotating the wheel comprising: a rotary bladed impeller connected to said wheel; an apron covering the upper semicircular path of travel of said impeller whereby to prevent interference by the airstream, the blades of the lower semicircular path of travel of said impeller being exposed to the airstream whereby to assist in rotation thereof; means containing an explosive charge connected to the said apron; and means for exploding said explosive charge including a firing pin adjacent said explosive charge, a resilient member urging said firing pin towards said explosive charge, a releasable latch preventing movement of said firing pin and an energizable solenoid for actuating the latch thereby permitting said firing pin to move under the influence of said resilient member for exploding the explosive charge whereby the gases resulting from the explosion will actuate said fluid reaction means to cause prerotation of the landing wheel.

EARLE E. SUITER.

REFERENCES CITED

The following references are of record in the file of this patent:

UNITED STATES PATENTS

| Number | Name | Date |
|---|---|---|
| 657,124 | Libbey | Sept. 4, 1900 |
| 783,114 | Flucks | Feb. 21, 1905 |
| 1,884,479 | Woolson | Oct. 25, 1932 |
| 2,154,572 | Lansing | Apr. 18, 1939 |
| 2,287,491 | Wolverton | June 23, 1942 |
| 2,363,126 | Gibson | Nov. 21, 1944 |
| 2,370,316 | Juul | Feb. 27, 1945 |
| 2,372,207 | Kendrick | Mar. 27, 1945 |
| 2,376,621 | Reed | May 22, 1945 |
| 2,381,842 | Schwend | Aug. 7, 1945 |
| 2,386,301 | Duke | Oct. 9, 1945 |
| 2,389,525 | Manheim Sr. | Nov. 20, 1945 |

FOREIGN PATENTS

| Number | Country | Date |
|---|---|---|
| 700,357 | Germany | Dec. 18, 1940 |